United States Patent [19]
Clarke-Bolling et al.

[11] Patent Number: 5,392,983
[45] Date of Patent: Feb. 28, 1995

[54] REUSABLE GIFT WRAP

[75] Inventors: Patricia Clarke-Bolling; Debra Will, both of Englewood, Colo.

[73] Assignee: It's A Wrap!, Englewood, Colo.

[21] Appl. No.: 99,698

[22] Filed: Jul. 30, 1993

[51] Int. Cl.6 .................. B65D 65/14; B65D 65/02
[52] U.S. Cl. ................. 229/87.19; 229/87.18; 229/87.01; 229/87.03; 206/457; 428/194
[58] Field of Search ............. 229/87.19, 87.18, 87.01, 229/87.03; 206/457; 428/4, 343, 194

[56] References Cited

U.S. PATENT DOCUMENTS

| | | | |
|---|---|---|---|
| 3,311,289 | 3/1967 | French | 229/87 |
| 3,355,092 | 11/1967 | Le Pain | 229/87 |
| 3,366,313 | 1/1968 | Culberg et al. | 229/87 |
| 3,489,333 | 1/1970 | Culberg et al. | 229/87 |
| 3,658,240 | 4/1972 | Stoll | 229/87.19 |
| 3,790,069 | 2/1974 | Straccamore | 229/87.19 |
| 4,487,872 | 12/1984 | Takemoto et al. | 524/127 |
| 4,776,511 | 10/1988 | Tischer | 229/87.19 |
| 4,967,952 | 11/1990 | Roessiger | 229/87 |
| 4,994,322 | 2/1991 | Delgado et al. | 428/343 |
| 5,004,144 | 4/1991 | Selga | 229/87 |
| 5,186,988 | 2/1993 | Dixon | 383/37 |
| 5,215,818 | 6/1993 | Silver et al. | 428/343 |

*Primary Examiner*—Daniel R. Zirker
*Attorney, Agent, or Firm*—Greenlee and Winner

[57] ABSTRACT

The invention relates to a reusable fabric gift wrapping, which wrapping is complete in itself, requiring no additional materials such as separate fastening or adhesive means, and which accommodates a variety of box sizes and shapes. The reusable gift wrapping comprises a washable fabric sheet which is secured during wrapping by means of a resealable adhesive coating.

6 Claims, 4 Drawing Sheets

REUSABLE GIFT WRAP

FIELD OF THE INVENTION

The present invention relates to reusable fabric gift wrappings, which wrappings are complete in and of themselves, requiring no additional materials such as separate fastening or adhesive means, and which accommodate a variety of box sizes and shapes.

BACKGROUND OF INVENTION

Packages are typically gift wrapped using a number of separate steps and a variety of wrapping materials. The gift wrapping must normally be cut to size before being folded around the package, then held in place while transparent adhesive tape is applied across the overlapping edges to secure the wrapping.

In addition to being cumbersome and time consuming, the conventional wrapping process uses paper or other disposable products as the wrapping material. The disposable gift wrap is usually irreparably damaged during unwrapping and must be discarded after a single use. As a result, massive quantities of paper are consumed annually in the production of disposable wrapping paper, requiring the destruction of many acres of forest land and causing needless expenditures of limited timber resources. The disposal of conventional wrapping paper also creates significant environmental problems. According to the U.S. Environmental Protection Agency, over 500,000 tons of wrapping paper are dumped into American landfills each year. The conventional gift wrapping process is thus costly, wasteful and harmful to the environment.

Various gift wrappings have been designed to minimize the number of steps and materials required in the gift wrapping process. Examples include self-wrapped boxes (U.S. Pat. Nos. 3,355,092 (Le Pain) and 4,967,952 (Roessiger)), prefabricated gift wrapping (U.S. Pat. Nos. 3,311,289 (French), 3,366,313 Culberg et al.), 3,381,889 (Laskow), and 3,489,333 (Culberg et al.)), and a plastic, heat shrinkable bag (U.S. Pat. No. 5,186,988 (Dixon)). Although these gift wrapping devices may expedite the wrapping process and mitigate the inconvenience, all involve the use of disposable, single-use wrapping materials. Thus, none of these gift wrappings address the above-noted problems of expense, waste and damage to the environment.

U.S. Pat. No. 5,004,144 (Selga) discloses another improved gift wrapping, the improvement comprising a reusable fabric gift wrap having releasable Velcro TM fasteners secured to its periphery. While this gift wrap is both complete and reusable, the design suffers in several respects. First, and importantly, each gift wrap accommodates only one standard-size box. Wraps must therefore be constructed and purchased for each particular package shape and size. The instant invention, in contrast, accommodates a variety of package sizes and shapes. Second, the gift wrap must be carefully folded to ensure exact alignment, and thus effective engagement, of the Velcro TM contact strips. Precise strip alignment is required to properly secure the wrapping. Finally, Velcro TM fasteners tend to accumulate lint and debris, particularly during washing, and may detach from the fabric after repeated use.

A need therefore exists for a practical, reusable fabric gift wrap, which is complete in and of itself, and which fits a variety of box sizes and shapes.

SUMMARY OF THE INVENTION

The present invention eliminates the need for disposable, single-use gift wrapping by providing a reusable fabric gift wrap. The use of such a reusable fabric gift wrapping eliminates the dependence on timber products for the production of gift wrapping, and also obviates the environmental problems associated with the disposal of conventional paper gift wrapping.

The present invention provides a relatively inexpensive and long lasting alternative to traditional paper gift wrap. The sturdy fabric wrap withstands repeated wrappings and, if soiled, is easily washed to return the wrap to its original attractive condition. The reusable fabric gift wrap thus reduces the significant replacement costs associated with traditional gift wrapping paper.

Another important aspect of the present invention is to provide a reusable fabric gift wrap which can readily accommodate various package sizes and shapes. In accordance with this aspect of the invention, an adhesive coating is applied at the periphery of the reusable fabric gift wrap. In a preferred embodiment, a resealable vinyl acetate polymer, sold commercially by 3M Corporation under the registered trademark "Tack It Again," is applied to the border of at least a portion of each of three edges of the wrapping. Although a resealable vinyl acetate polymer is the preferred adhesive coating, any substance or combination of substances having suitable adhesive and resealing properties will work. Most preferably, the adhesive coating is applied to a pair of fabric tabs, attached to opposite sides of the wrap, and to at least a portion of the edge of a third side. The resealable adhesive coating effectively adheres on contact to any portion of the gift wrap, thereby obviating the need for careful folding and precise alignment of a pair of mating contact strips. The reusable fabric gift wrap of the present invention thus provides a significant advantage over known fabric gift wraps by eliminating the strict folding requirements and the concomitant limitations on package shape and size.

Still another significant aspect of the present invention is to provide a reusable gift wrapping for a box or carton which is extremely simple in design. The present invention requires only a single sheet of wrapping material and can be quickly and easily applied by persons without special training or skill. The reusable fabric gift wrapping is complete in itself, requiring no additional materials, such as separate fastening or adhesive means.

The reusable fabric gift wrap of the invention can be formed of any suitable fabric material including, but not limited to, cotton, polyester, rayon, silk and wool. Cotton is the preferred wrapping material due to its light weight, durability, ready availability, and ease of care and economy. The fabric wrap may be formed of a single fabric sheet, or a plurality of sheets may be used for purposes of package protection and reversibility. The fabric wrap may be printed with designs indicative of particular gift-giving situations or with a generic pattern suitable for all occasions and recipients. In a preferred embodiment, the fabric wrap is formed of a solid-colored fabric (most preferably white) which can be decorated with customized print by the user using coordinating fabric pens, with colorful permanent ink, and color-coordinated ribbon.

In a preferred embodiment, an adjustable fabric ribbon is attached to one edge of the fabric gift wrap. The adjustable fabric ribbon is preferably attached at or near its center point to the edge of the wrap on the side comprising the adhesive coating, or adjacent to the two sides with coated fabric tabs, as discussed above. Most preferably, the fabric ribbon is folded to form a decorative bow at one end. The adjustable fabric ribbon may be produced to match the fabric wrap or may be made in complementary colors or patterns. The adjustable ribbon, which is pretreated with an adhesive coating at both ends, is pulled tight around the package to complete the wrapping process and to further secure the gift wrap.

The exact nature of this invention as well as other features and advantages thereof will be readily apparent from consideration of the specification, including the drawings. Those of skill in the art will appreciate that the invention described herein is susceptible to many modifications and variations without departing from its scope as defined by the appended claims.

BRIEF DESCRIPTION OF THE DRAWINGS

The accompanying drawing illustrates preferred embodiments of the invention, wherein.

DESCRIPTION OF THE PREFERRED EMBODIMENTS

Figure 1:
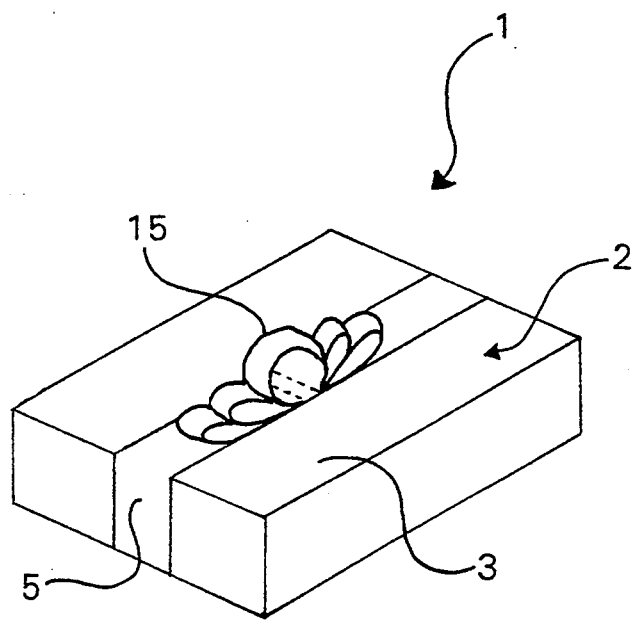
FIG. 1 is a perspective view of the reusable gift wrap in an embodiment of the present invention.

Referring now to the drawings, like numbers indicate like features and the same number appearing in more than one figure refers to the same element.

Figure 2:
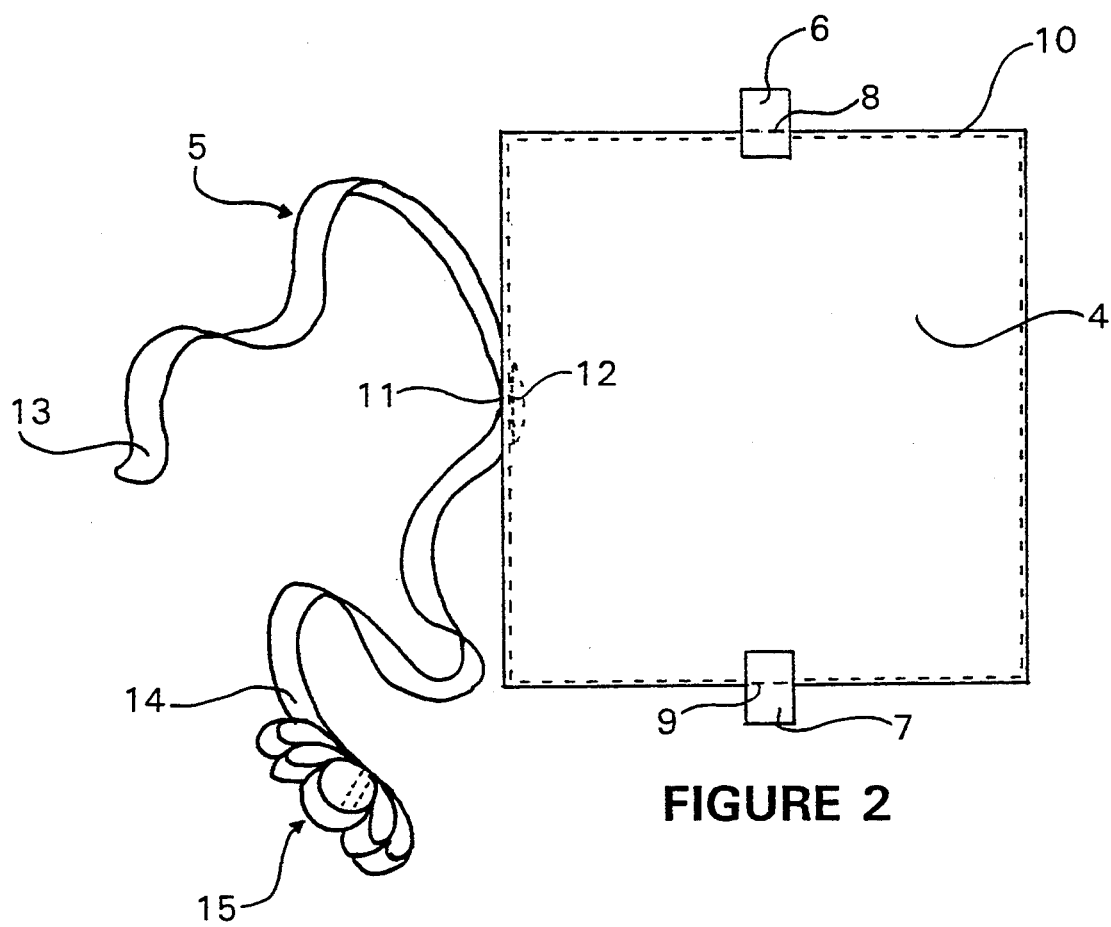
FIG. 2 is a plane view of a square sheet of fabric wrap employed in the article of FIG. 1, showing the location of attachment of the two adhesive-coated tabs and the location of attachment of an adjustable fabric ribbon.

FIG. 1 illustrates a unitary, reusable gift wrap 1 comprising a flat, square sheet of fabric 2 having an outer exposed surface 3 and an opposite inner concealed surface 4, visible in FIG. 2. The flat sheet of fabric 2 further comprises surge stitches of thread be extending about the entire perimeter of the fabric 2. The reusable gift wrap 1 also includes an adjustable fabric ribbon 5, which is approximately one inch to one and one-half inches in width.

As illustrated in FIG. 2, a pair of fabric tabs 6 and 7 are attached on opposite sides of the inner concealed surface 4 of the fabric 2 by stitched seams 8 and 9, respectively. The fabric tabs 6 and 7 are preferably formed of a rectangular strip of matching fabric, which is approximately one inch in width and two inches in length, which is folded over and sewn together at stitched seams 8 and 9. Alternatively, fabric tabs 6 and 7 are formed of one-inch square pieces of fabric. Like the wrap fabric 2, fabric tabs 6 and 7 are first sewn about their perimeters with surge stitching, prior to attachment to the fabric 2. The concealed inner surfaces of fabric tabs 6 and 7 are treated, after attachment, with a resealable adhesive coating such as Tack It Again ™.

Also as illustrated in FIG. 2, an adjustable fabric ribbon 5 is attached at or near its center point 11 to the outer exposed surface 3 of fabric 2 by a stitched seam 12. The adjustable fabric ribbon 5 comprises a first end 13 and a second end 14, said second end 14 terminating in a decorative bow 15.

Figure 3:
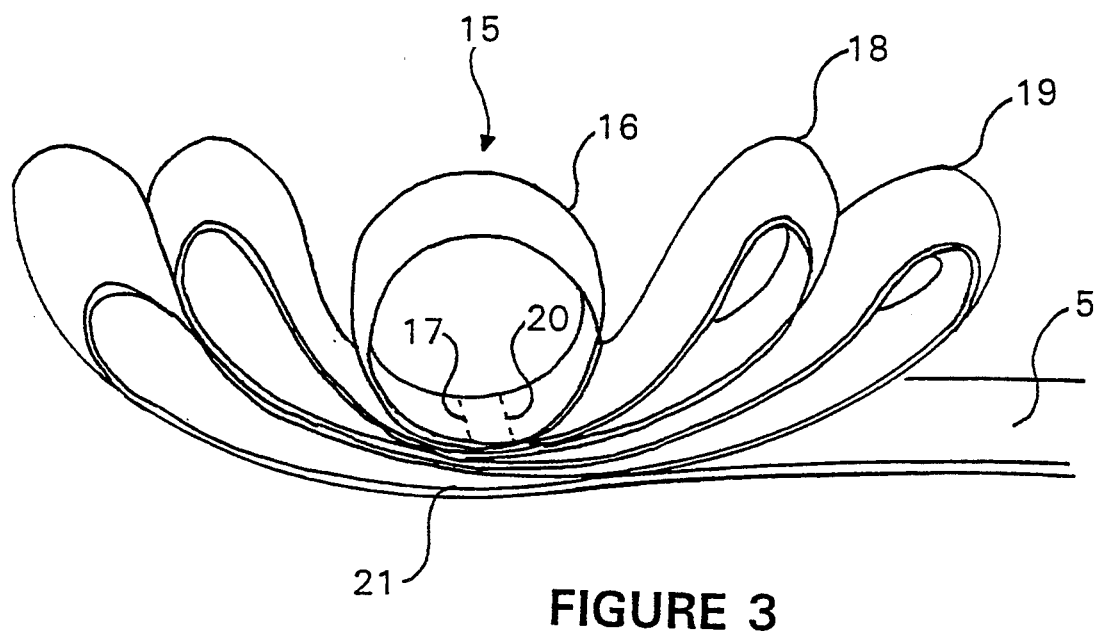
FIG. 3 is a perspective view of the decorative bow of FIGS. 1 and 2, shown in isolation, illustrating the manner in which the loops are juxtaposed together.

The construction of decorative bow 15 is illustrated in FIG. 3. To create the bow 15, the second end 14 of ribbon 5 is looped around itself to form an inner loop 16. Inner loop 16 is then sewn closed by a transverse line of stitching 17. The second end 14 of ribbon 5 is then further folded, as illustrated, to form two additional loops of increasing diameter, loops 18 and 19, respectively. Loops 16, 18 and 19 are then flattened and secured together with the transverse seam 20 near their concentric center.

Prior to use, resealable adhesive coating such as a resealable vinyl acetate polymer is applied to first end 13 and to the underside 21 of bow 15. Each of these two adhesive coatings covers an area of approximately one inch in width and approximately one to two inches in length. A resealable adhesive coating is also applied, prior to wrapping, to at least one of the four outer edges of the inner concealed surface 4, preferably including the edge comprising stitched seam 12. The resealable adhesive coating(s) on the edge(s) of inner concealed surface 4 is approximately one inch wide and preferably extends the entire length of the package to be wrapped. Although a resealable vinyl acetate polymer is the preferred adhesive coating, any substance or combination of substances having suitable adhesive and resealing properties will work.

Figure 4:
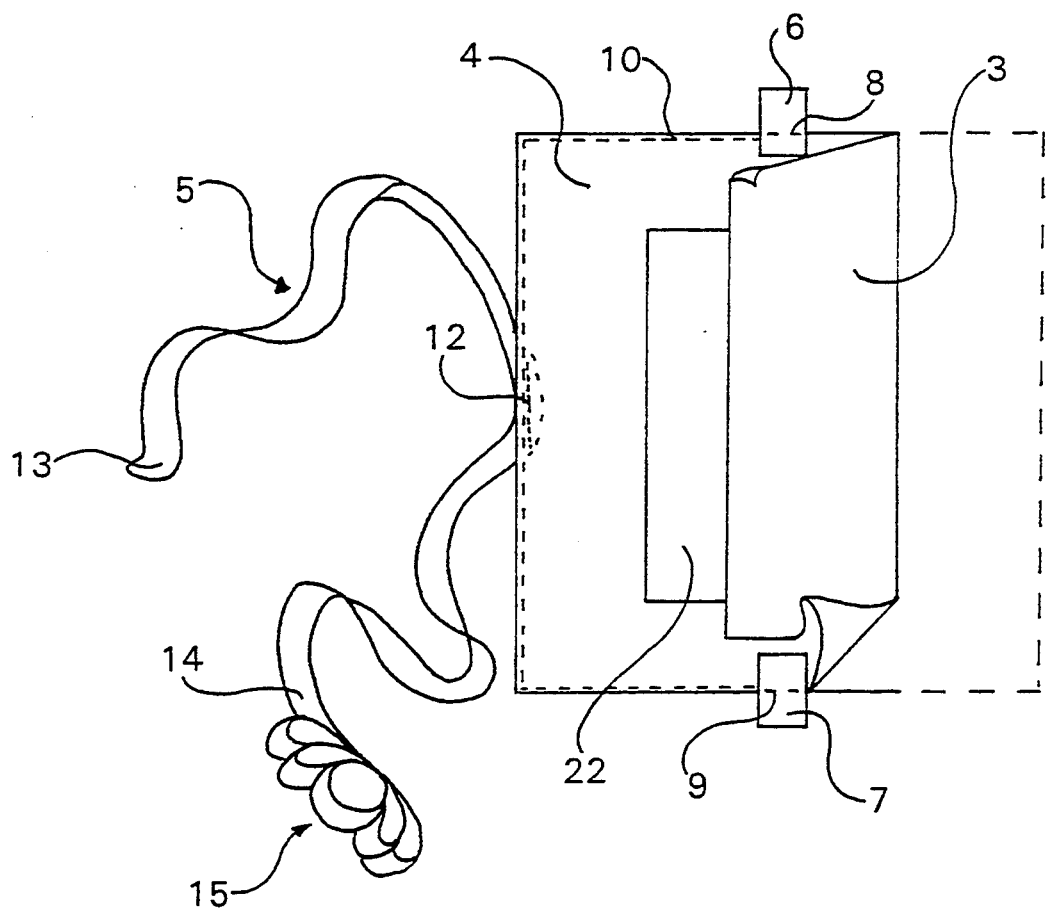
FIG. 4 is a perspective view illustrating a first intermediate stage in applying the fabric gift wrapping of FIG. 2 to a box.
Figure 5:
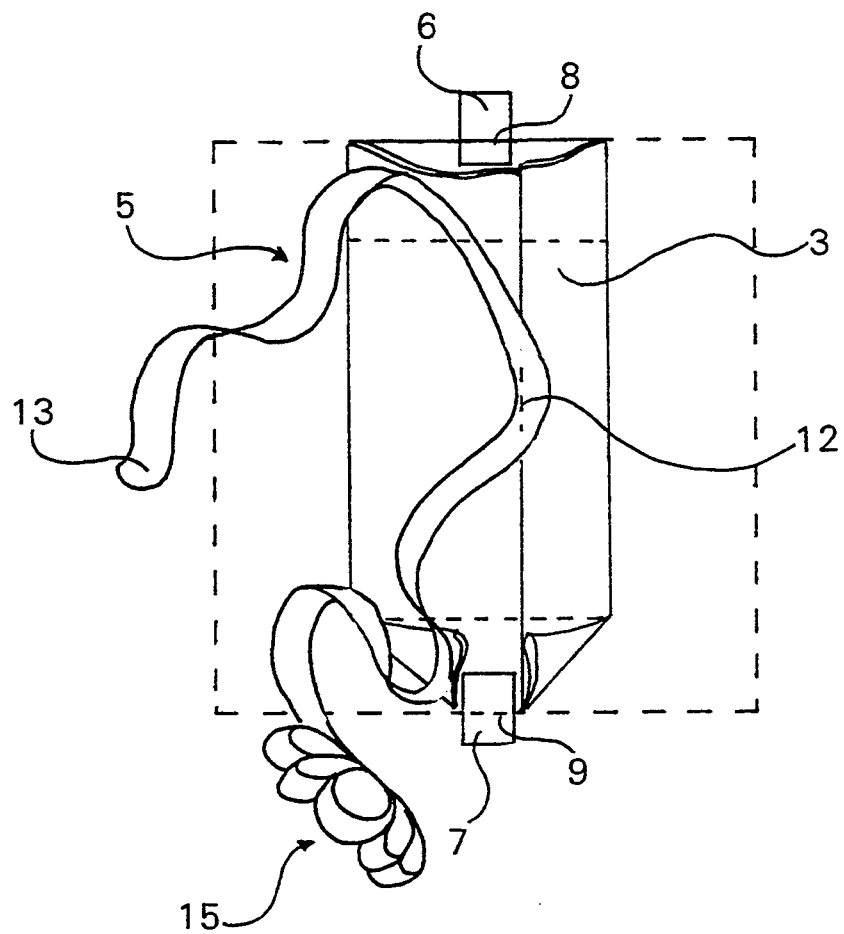
FIG. 5 is a perspective view illustrating a second intermediate stage in applying the fabric gift wrapping of FIG. 2 to a box.
Figure 6:
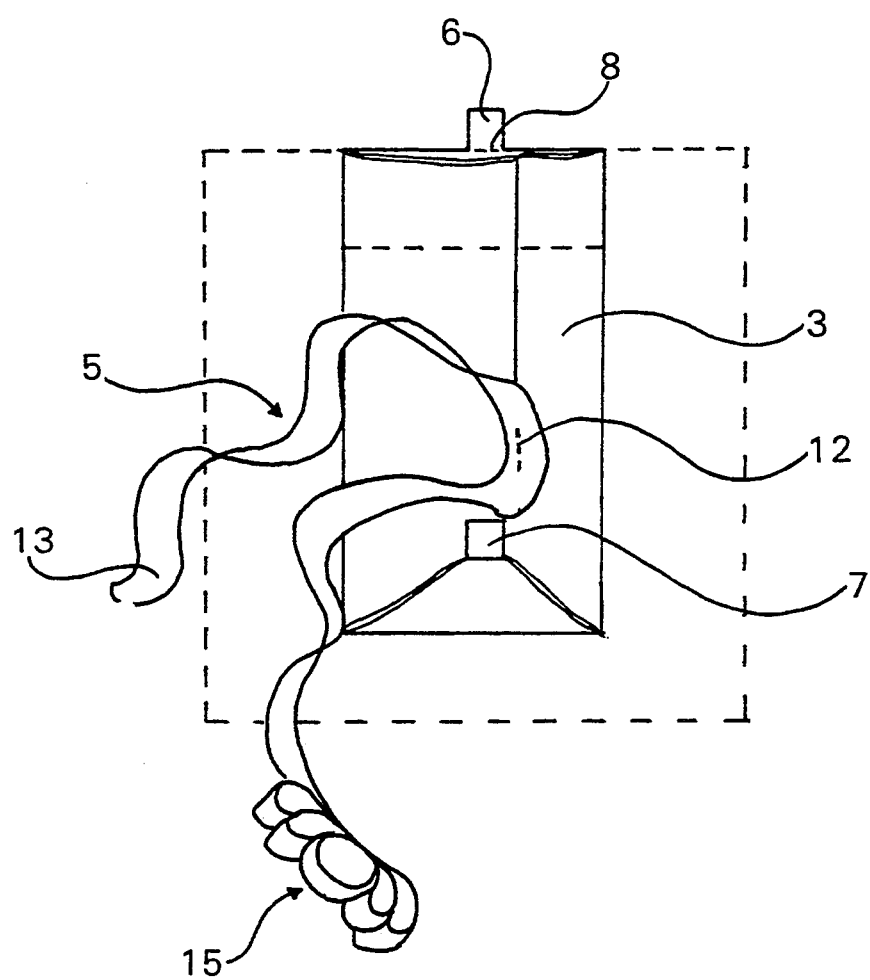
FIG. 6 is a perspective view illustrating a third intermediate stage in applying the fabric gift wrapping of FIG. 2 to a box.

In the wrapping operation, best seen in FIGS. 4–6, the fabric 2 is placed with its outer side 3 facing downward and the inner surface 4, which is ultimately concealed, facing outward. A generally rectangular, hexahedral box 22 containing a gift to be wrapped is then placed onto the inner surface 4 of the fabric 2. One side of fabric 2, preferably the side opposite seam 12, is then folded inwardly toward the upwardly facing bottom or back of box 22, as shown in FIG. 4. An outer corner of the folded fabric 2 is then pulled toward the back of box 22, also as shown in FIG. 4. The opposite side of fabric 2, attached to fabric ribbon 5 and comprising seam 12, is then folded over the back of box 22 and secured to said box by the adhesive coating on the edge of inner concealed surface 4, as depicted in FIG. 5. Next, the triangular-shaped flap formed from the double folding of fabric 2 is pulled taut over the covered box, as shown in FIG. 6. The adhesive coating on the inner surface of fabric tab 7 is pressed against the back of box 22 to secure the folded flap to the enclosed box. The side of fabric 2 opposite tab 7 is then folded over the back of box 22 in a like manner and secured to said box back by pressing the adhesive-coated tab 6 to the box. The package is then turned over into the position depicted in FIG. 1 so that both of the folded flaps are on the underside. The first end 13 of adjustable ribbon 5 is pulled around the package and secured to the outer surface 3 by pressing the resealable adhesive coating to the top of box 22. Finally, to complete the wrapping process and to further secure the gift wrap, the second end 14 of ribbon 5 is pulled tight around the package and secured to the outer surface of first end 13 by pressing the adhesive-coated underside 21 of bow 15 to said outer surface of ribbon end 13.

In a preferred embodiment, the reusable gift wrap is constructed to accommodate conventional medium box sizes, namely boxes ranging in size from approximately fifteen inches in length, nine and one-half inches in width, and two inches in height, to boxes of about eleven and one-half inches in length, eight inches in width, and one and one-half inches in height. Medium box sizes are generally used, for example, to wrap shirts, shoes, picture frames and lingerie. To fit such medium size packages, fabric 2 is a twenty-four by twenty-four inch square sheet, and the fabric ribbon 5 is one inch in width and fifty-nine inches in length. The fabric ribbon 5 is attached by a one-inch stitched seam 12 to the fabric 2 at approximately eighteen inches from the edge of first end 13, and the bow 15 is constructed using the first twenty-seven inches of second end 14.

In an alternate preferred embodiment, the reusable gift wrap is constructed to accommodate conventional large box sizes, namely boxes ranging in size from between about seventeen inches in length, eleven inches in width, and three inches in height, and boxes of about fifteen inches in length, nine and one-half inches in width, and two inches in height. Large box sizes are generally used, for example, to wrap sweaters, linens, games and placemats. To fit these large-size packages, fabric 2 is a twenty-nine by twenty-nine inch square sheet, and the fabric ribbon 5 is approximately one and one-half inches in width and sixty-eight inches in length. The fabric ribbon 5 is attached to the fabric 2 at about twenty-two inches from the edge of first end 13, and the bow 15 is constructed using the first twenty-eight inches of second end 14.

Obviously, many modifications and variations of the present invention are possible and will be evident to those of ordinary skill in the art. For example, while the embodiment shown in the drawings hereof comprises a single fabric sheet, a plurality of juxtaposed sheets may be used for purposes of package protection and reversibility. Moreover, although the exemplified ribbon terminates in a longitudinal, multi-looped bow structure, the present invention contemplates all ribbon and bow styles, including plain, nondecorative ribbons and ribbons in combination with hemispherical bows. Further, although the disclosed material dimensions accommodate a variety of box sizes and shapes, the reusable gift wrap can be constructed from any size or shape starting materials to fit packages of extraordinary sizes and non-conventional shapes. Finally, although the exemplified reusable gift wrap does not include additional accessories such as greeting cards or card holders, such accessories can be readily attached to the reusable gift wrap by a variety of means well known in the art.

It is therefore to be understood that within the scope of the appended claims, the invention may be practiced in ways other than as specifically described herein.

We claim:

1. A reusable gift wrapping comprising:
    a unitary fabric wrap for receiving a gift therein, said fabric wrap having an outer surface and an inner surface, wherein at least one edge of said inner surface has a surface coating of a resealable vinyl acetate polymer adhesive; and
    at least two flexible fabric tabs attached to opposite sides of the inner surface of said fabric wrap, wherein said flexible fabric tabs have a surface coating of
    said resealable adhesive; and
    a fabric ribbon attached to said fabric wrap for decorating and securing said gift wrapping, wherein said fabric ribbon comprises a first end and a second end, wherein said second end terminates in a decorative bow selected from the group consisting of longitudinal, multi-looped and hemispherical design bows.

2. The reusable gift wrapping of claim 1 wherein said fabric wrap is formed of a solid-colored fabric, wherein said solid-colored fabric is decorated by the user using coordinating fabric pens.

3. The reusable gift wrapping of claim 1 wherein said outer surface and inner surface are reversible.

4. The reusable gift wrapping of claim 1 wherein said fabric wrap further comprises surge stitches of thread extending about its entire perimeter.

5. The reusable gift wrapping of claim 1 wherein said fabric wrap comprises a plurality of fabric sheets.

6. The reusable gift wrapping of claim 1 wherein said fabric wrap further comprises a fabric card holder attached thereto.

* * * * *